US012632520B2

(12) United States Patent
Richman et al.

(10) Patent No.: US 12,632,520 B2
(45) Date of Patent: May 19, 2026

(54) SYSTEM FOR PROVISIONING AUTHENTICATED ACCESS TO RESOURCES LINKED WITH INDIVIDUAL CHARACTERISTIC DATA

(71) Applicant: BANK OF AMERICA CORPORATION, Charlotte, NC (US)

(72) Inventors: Adam B. Richman, Charlotte, NC (US); Derryn Bronstein, Park Ridge, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 202 days.

(21) Appl. No.: 18/096,412

(22) Filed: Jan. 12, 2023

(65) Prior Publication Data

US 2024/0241927 A1 Jul. 18, 2024

(51) Int. Cl.
*G06F 21/31* (2013.01)
(52) U.S. Cl.
CPC ................................... *G06F 21/31* (2013.01)
(58) Field of Classification Search
CPC ....................................................... G06F 21/31
See application file for complete search history.

(56) References Cited

U.S. PATENT DOCUMENTS

| | | | |
|---|---|---|---|
| 9,069,979 B2 | 6/2015 | Srinivasan | |
| 9,141,410 B2 | 9/2015 | Leafe | |

| | | | |
|---|---|---|---|
| 9,231,935 B1 * | 1/2016 | Bridge | ..................... H04L 63/08 |
| 9,288,214 B2 | 3/2016 | Chang | |
| 9,350,599 B1 * | 5/2016 | Enright | ................. H04L 63/083 |
| 9,426,155 B2 | 8/2016 | Chao | |
| 9,465,953 B2 | 10/2016 | Sharma | |
| 9,560,080 B2 | 1/2017 | Banatwala | |
| 10,673,840 B2 | 6/2020 | Shukla | |
| 10,841,316 B2 | 11/2020 | Innes | |
| 10,880,292 B2 | 12/2020 | Koottayi | |
| 10,908,837 B2 | 2/2021 | Fetik | |
| 10,922,284 B1 | 2/2021 | Venkatasubramanian | |
| 11,115,211 B2 | 9/2021 | Norman | |
| 11,244,064 B2 | 2/2022 | Dutta | |
| 11,463,488 B2 | 10/2022 | Mohamad Abdul | |
| 11,489,827 B2 | 11/2022 | Knotwell | |
| 11,489,872 B2 | 11/2022 | Shukla | |
| 11,640,470 B1 * | 5/2023 | Amar | ................. G06Q 10/0635 726/22 |

(Continued)

*Primary Examiner* — Techane Gergiso
*Assistant Examiner* — Jacob Benedict Knackstedt
(74) *Attorney, Agent, or Firm* — Moore & Van Allen PLLC; Nicholas C. Russell

(57) ABSTRACT

A system is provided for provisioning authenticated access to resources linked with individual characteristic data. In particular, the system may comprise an endpoint device associated with a primary user, where the endpoint device stores a resource that is secured using the authentication credentials of the primary user. The endpoint device may have an authentication agent installed thereon that may manage authenticated access to the endpoint device and/or the resources stored thereon. In the event of the primary user's unavailability, a secondary user may attempt to pass the authentication check of the primary user's endpoint device. If a match is found, the authentication agent may grant authorization for the secondary user to access the endpoint device and/or the resources stored thereon.

17 Claims, 4 Drawing Sheets

(56) References Cited

U.S. PATENT DOCUMENTS

| 2007/0083610 | A1 |   | 4/2007 | Treder |
| 2011/0125894 | A1 |   | 5/2011 | Anderson |
| 2015/0229629 | A1 |   | 8/2015 | Ishaya |
| 2017/0223117 | A1 |   | 8/2017 | Messerli |
| 2020/0106777 | A1 | * | 4/2020 | Hu ........................... G06F 21/43 |
| 2021/0211868 | A1 | * | 7/2021 | Rodriguez Bravo . H04W 12/35 |
| 2021/0279991 | A1 | * | 9/2021 | Shankar ............. G07C 9/00896 |
| 2022/0021652 | A1 |   | 1/2022 | Moghe |
| 2022/0070279 | A1 |   | 3/2022 | Pang |
| 2022/0091998 | A1 |   | 3/2022 | Lal |
| 2022/0166731 | A1 | * | 5/2022 | Rey ........................ G06Q 10/10 |
| 2024/0080323 | A1 | * | 3/2024 | Balmakhtar ............ H04L 41/16 |
| 2024/0257926 | A1 | * | 8/2024 | Langel ................... G16H 10/20 |

* cited by examiner

SYSTEM FOR PROVISIONING AUTHENTICATED ACCESS TO RESOURCES LINKED WITH INDIVIDUAL CHARACTERISTIC DATA

FIELD OF THE INVENTION

The present invention embraces a system for provisioning authenticated access to resources linked with individual characteristic data.

BACKGROUND

There is a need for a secure and efficient way to grant authenticated access to resources.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for provisioning authenticated access to resources linked with individual characteristic data. In particular, the system may comprise an endpoint device associated with a primary user, where the endpoint device stores a resource (and/or information regarding the resource) that is secured using the authentication credentials of the primary user. The endpoint device may have an authentication agent installed thereon that may manage authenticated access to the endpoint device and/or the resources stored thereon. In the event of the primary user's unavailability, a secondary user may attempt to pass the authentication check of the primary user's endpoint device. Upon detecting the unavailability of the primary user, the authentication agent on the endpoint device may receive the authentication credentials from the secondary user and compare the credentials against an authentication credential registry. If a match is found, the authentication agent may grant authorization for the secondary user to access the endpoint device and/or the resources stored thereon. In this way, the system provides a secure and efficient way to provision authenticated access to a secondary user.

Accordingly, embodiments of the present disclosure provide a system for provisioning authenticated access to resources linked with individual characteristic data, the system comprising at least one non-transitory storage device; and at least one processor coupled to the at least one non-transitory storage device, wherein the at least one processor is configured to receive, at an endpoint device associated with a primary user, a request from a secondary user to access a resource stored on the endpoint device, wherein the request comprises individual characteristic data associated with the secondary user; determine that the primary user is unavailable; based on determining that the primary user is unavailable, retrieve reference authentication data from an authentication credential repository; and determine whether a match is detected between the individual characteristic data associated with the secondary user and an entry within the reference authentication data.

In some embodiments, determining whether a match is detected comprises detecting the match between the individual characteristic data associated with the secondary user and the entry within the reference authentication data; and based on detecting the match, granting the secondary user with authorized access to the resource stored on the endpoint device.

In some embodiments, determining whether a match is detected comprises detecting no match between the individual characteristic data associated with the secondary user and the entry within the reference authentication data; and based on detecting no match, blocking the secondary user from accessing the resource stored on the endpoint device.

In some embodiments, retrieving the reference authentication data from the authentication credential repository comprises using a machine learning model to convert the reference authentication data into a format that is recognizable to the endpoint device as authentication data.

In some embodiments, the at least one processor is further configured to present a graphical user interface on a display of the endpoint device, wherein the graphical user interface comprises one or more interface elements configured to receive, from the primary user, a selection of the secondary user as an authorized user.

In some embodiments, the one or more interface elements are further configured to receive, from the primary user, a revocation of authorization with respect to the secondary user.

In some embodiments, the individual characteristic data associated with the secondary user comprises at least one of a fingerprint sample, retinal scan, or facial scan.

Embodiments of the present disclosure also provide a computer program product for provisioning authenticated access to resources linked with individual characteristic data, the computer program product comprising a non-transitory computer-readable medium comprising code causing an apparatus to receive, at an endpoint device associated with a primary user, a request from a secondary user to access a resource stored on the endpoint device, wherein the request comprises individual characteristic data associated with the secondary user; determine that the primary user is unavailable; based on determining that the primary user is unavailable, retrieve reference authentication data from an authentication credential repository; and determine whether a match is detected between the individual characteristic data associated with the secondary user and an entry within the reference authentication data.

In some embodiments, determining whether a match is detected comprises detecting the match between the individual characteristic data associated with the secondary user and the entry within the reference authentication data; and based on detecting the match, granting the secondary user with authorized access to the resource stored on the endpoint device.

In some embodiments, determining whether a match is detected comprises detecting no match between the individual characteristic data associated with the secondary user and the entry within the reference authentication data; and based on detecting no match, blocking the secondary user from accessing the resource stored on the endpoint device.

In some embodiments, retrieving the reference authentication data from the authentication credential repository comprises using a machine learning model to convert the reference authentication data into a format that is recognizable to the endpoint device as authentication data.

In some embodiments, the code further causes the apparatus to present a graphical user interface on a display of the endpoint device, wherein the graphical user interface comprises one or more interface elements configured to receive, from the primary user, a selection of the secondary user as an authorized user.

In some embodiments, the one or more interface elements are further configured to receive, from the primary user, a revocation of authorization with respect to the secondary user.

Embodiments of the present disclosure also provide a computer-implemented method for provisioning authenticated access to resources linked with individual characteristic data, the computer-implemented method comprising receiving, at an endpoint device associated with a primary user, a request from a secondary user to access a resource stored on the endpoint device, wherein the request comprises individual characteristic data associated with the secondary user; determining that the primary user is unavailable; based on determining that the primary user is unavailable, retrieving reference authentication data from an authentication credential repository; and determining whether a match is detected between the individual characteristic data associated with the secondary user and an entry within the reference authentication data.

In some embodiments, determining whether a match is detected comprises detecting the match between the individual characteristic data associated with the secondary user and the entry within the reference authentication data; and based on detecting the match, granting the secondary user with authorized access to the resource stored on the endpoint device.

In some embodiments, determining whether a match is detected comprises detecting no match between the individual characteristic data associated with the secondary user and the entry within the reference authentication data; and based on detecting no match, blocking the secondary user from accessing the resource stored on the endpoint device.

In some embodiments, retrieving the reference authentication data from the authentication credential repository comprises using a machine learning model to convert the reference authentication data into a format that is recognizable to the endpoint device as authentication data.

In some embodiments, the computer-implemented method further comprises presenting a graphical user interface on a display of the endpoint device, wherein the graphical user interface comprises one or more interface elements configured to receive, from the primary user, a selection of the secondary user as an authorized user.

In some embodiments, the one or more interface elements are further configured to receive, from the primary user, a revocation of authorization with respect to the secondary user.

In some embodiments, the individual characteristic data associated with the secondary user comprises at least one of a fingerprint sample, retinal scan, or facial scan.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
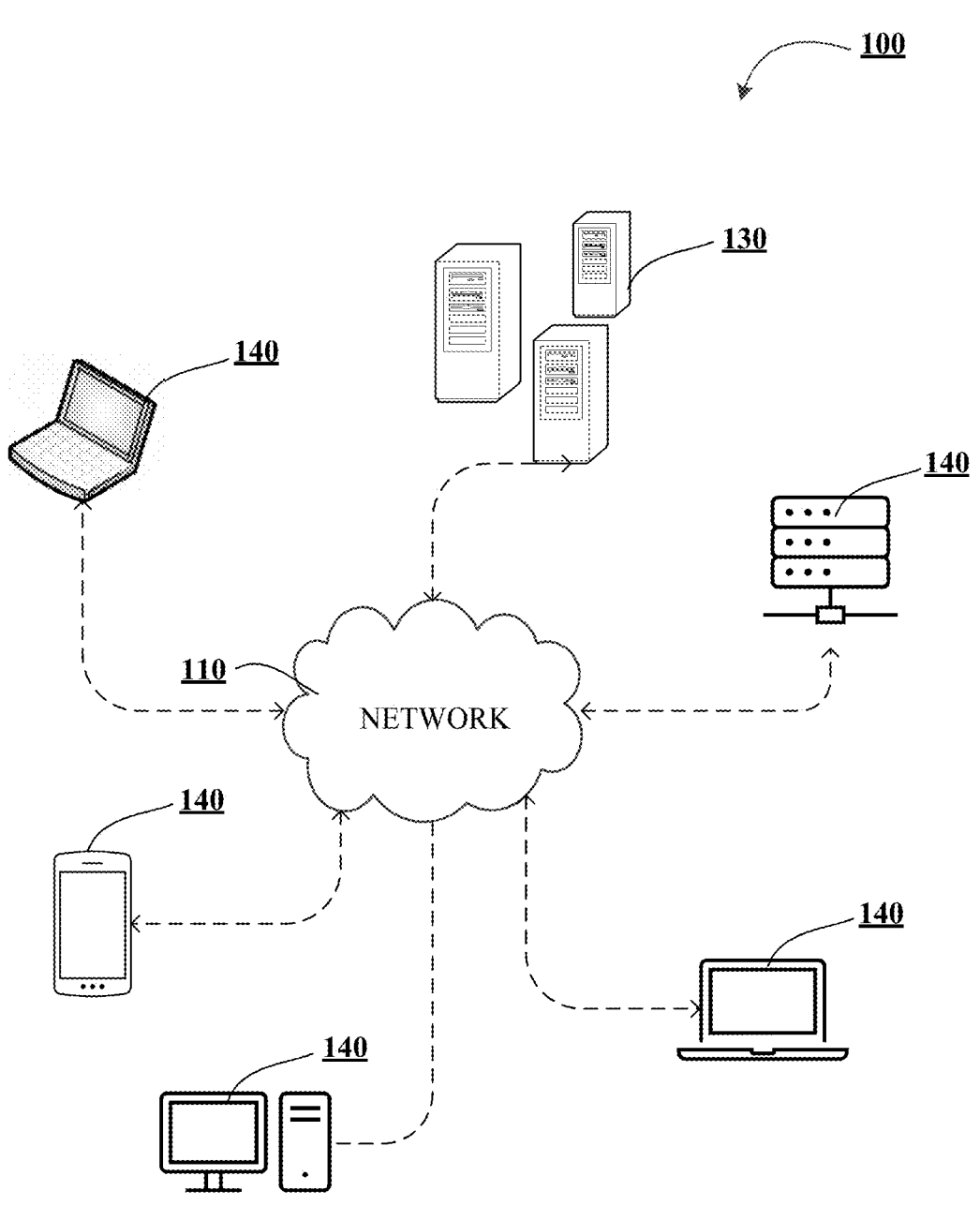
Figure 1B:
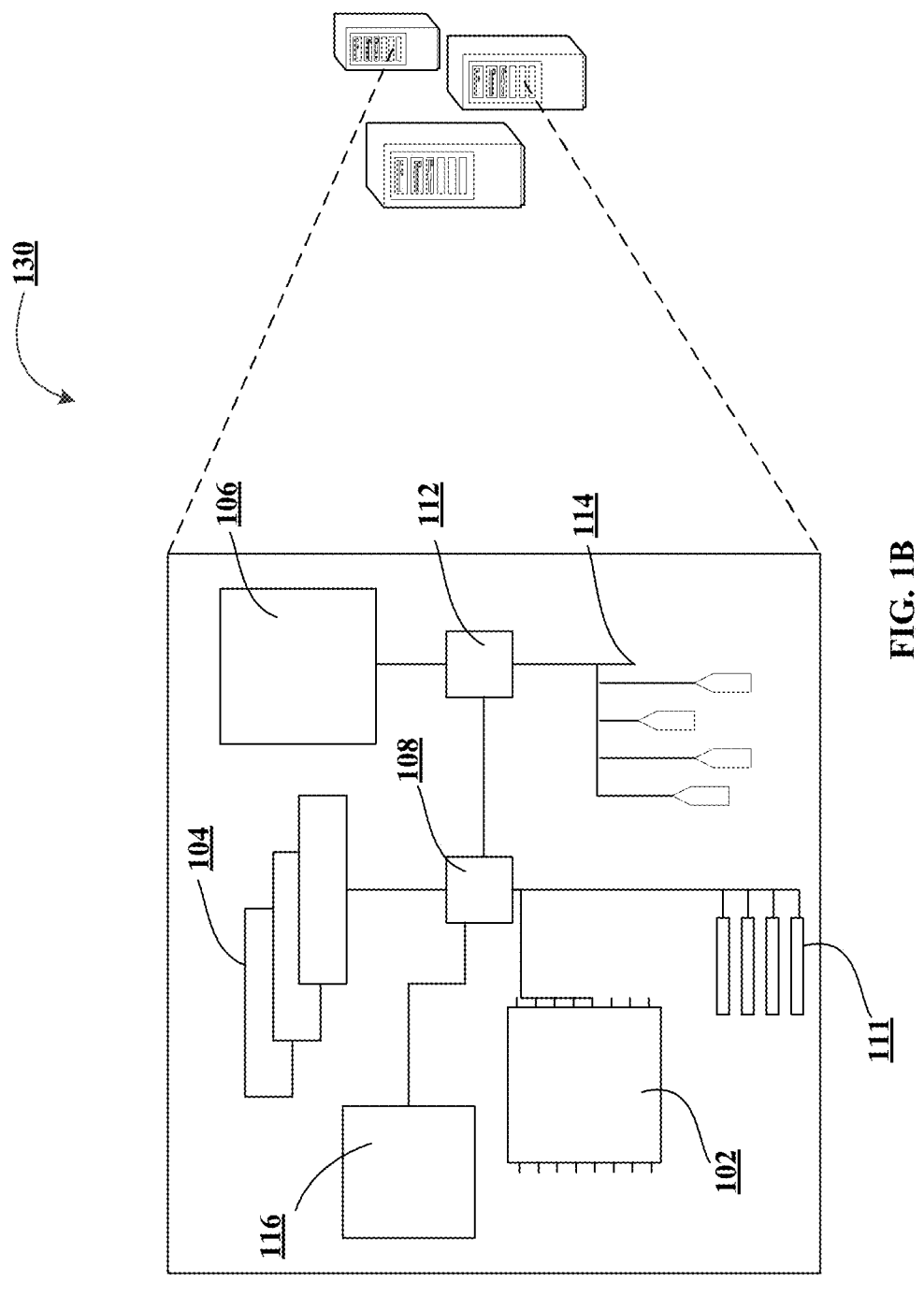
Figure 1C:
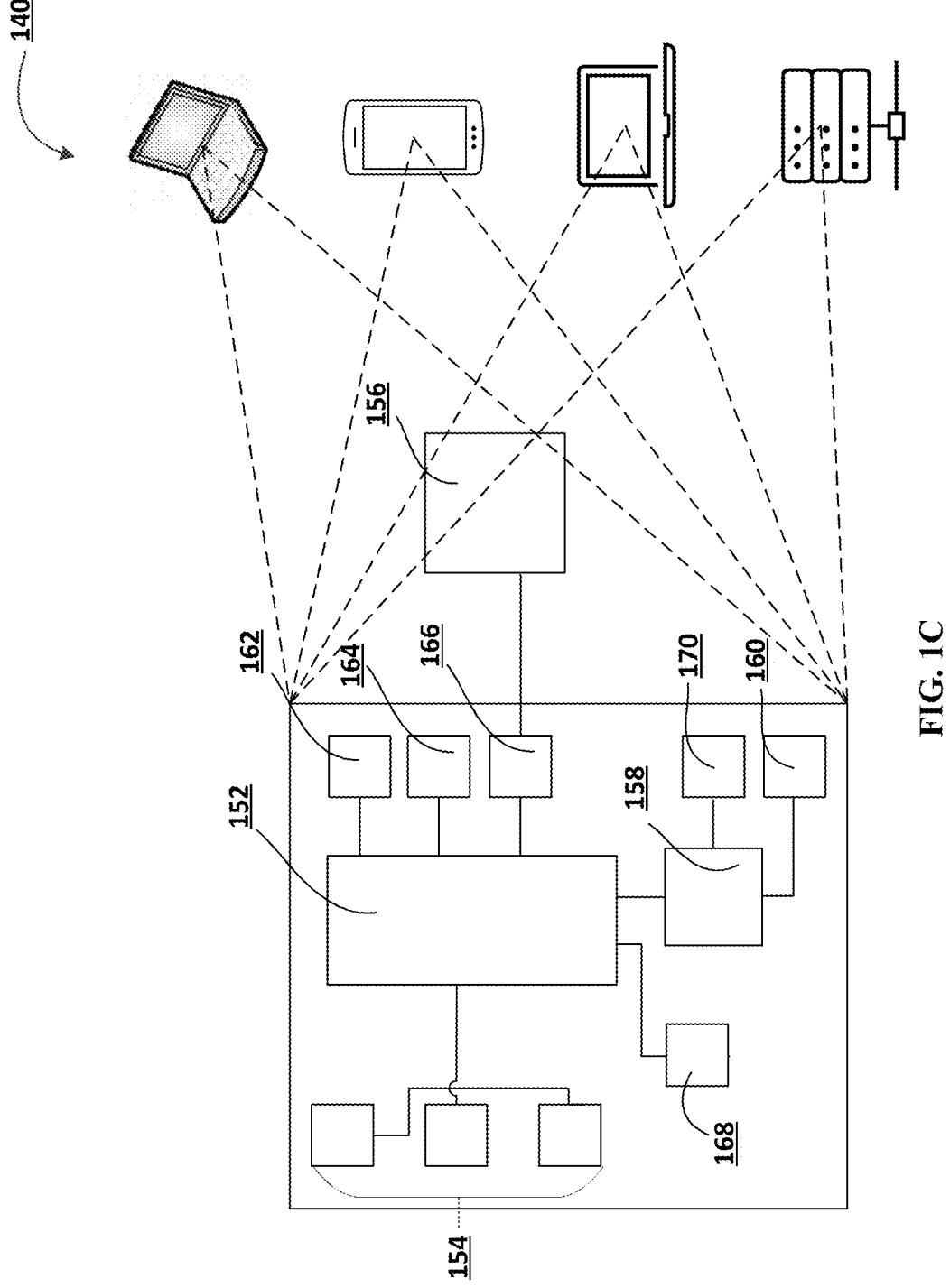
Figure 2:
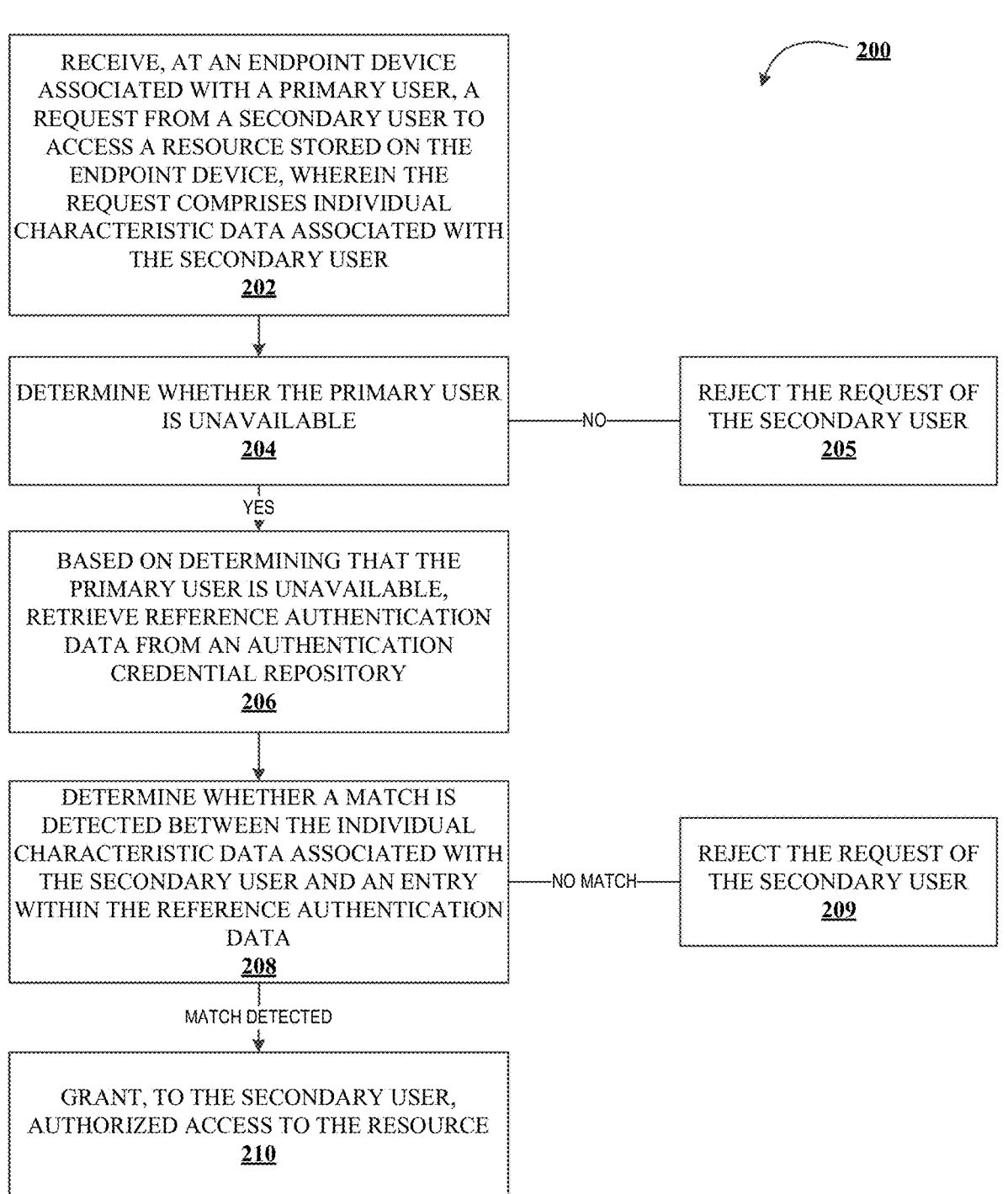

Having thus described embodiments of the invention in general terms, reference will now be made the accompanying drawings, wherein:

FIGS. 1A-1C illustrates technical components of an exemplary distributed computing environment for the system for provisioning authenticated access to resources linked with individual characteristic data, in accordance with an embodiment of the present disclosure; and FIG. 2 illustrates a process flow for provisioning authenticated access to resources linked with individual characteristic data, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, individual characteristic data (e.g., iris recognition, retina scans, fingerprints, finger veins, palm veins, palm prints, digital bone anatomy/structure and positioning of distal phalanges, intermediate phalanges, proximal phalanges, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user.

In some embodiments, "resources" may refer particularly to resources that may be owned by or associated with a particular user, such as cryptocurrency wallets, password management applications, two-factor authentication applications, personal data files, and/or the like.

With the proliferation of mobile smart devices, users may choose to secure the resources stored on their devices using authentication credentials such as individual characteristic data that is specific to the users, such as fingerprint data, facial image data, voice data, and/or the like. For instance, a user may store resources such as a cryptocurrency wallet, password management application, and/or the like on the device and secure such resources using the individual characteristic data. That said, it may be desirable to grant access to such resources to another user (e.g., a secondary user) in the event that the primary user (e.g., the owner of the resources and device) becomes unavailable (e.g., the primary user is deceased, incapacitated, missing, or the like).

To address the above scenarios among others, embodiments of the present disclosure provide a system for provisioning authenticated access to resources linked with individual characteristic data. In this regard, the system may allow a secondary user to access the resources of a primary user stored on the primary user's endpoint device by providing authentication credentials associated with the secondary user (e.g., individual characteristic data of the secondary user). Accordingly, the primary user may designate the secondary user as being authorized to access the resources in the event that the primary user becomes unavailable. The circumstances in which the secondary user may access the resources may be specified by the primary user (e.g., once the primary user is deceased).

In some embodiments, the endpoint device of the primary user may have an authentication agent installed thereon that manages the grant of authorized access to the primary user and/or one or more secondary users. In such embodiments, the authentication agent may control access to the various resources stored on the endpoint device based on the occurrence of certain conditions. For instance, while the primary user is available, the primary user may provide individual characteristic data as normal. In some embodiments, the authentication agent may present a graphical interface to the primary user that allows the primary user to designate one or more secondary users. In some embodiments, the authentication agent may further be configured to allow the primary user to revoke access rights of any secondary user that has previously been registered by the primary user.

If a secondary user attempts to access the endpoint device while the primary user is available, the authentication agent may automatically reject the authentication attempt of the secondary user and deny access to the resources. On the other hand, if the authentication agent detects that the primary user has become unavailable, the authentication agent may access an authentication credential registry for subsequent verification. The authentication credential registry may store individual characteristic data associated with various users (e.g., the secondary users). Accordingly, the secondary user may, prior to the primary user becoming unavailable, register a set of individual characteristic data with the authentication credential registry. Accordingly, the authentication agent may receive the individual characteristic data from the secondary user and compare such data against the data stored within the authentication credential registry. If a match is not detected, the authentication agent may reject the access attempt of the secondary user. On the other hand, if a match is detected, the authentication agent may grant the secondary user with access to the resources stored on the endpoint device. In this way, the system provides a secure way for secondary users to access the resources of the primary user in the event that the primary user becomes unavailable.

In some embodiments, the determination of whether the primary user has become unavailable may comprise retrieving status data associated with the primary user from one or more third party databases. For instance, the authentication agent may receive the status data from databases such as government databases, newspaper databases, or other databases that may store information regarding the status (e.g., unavailability) of the primary user. In other embodiments, the system may comprise a user status database that may store information regarding the status of users. In such embodiments, the data records within the user status database may be organized into a blockchain ledger and stored in a distributed manner across multiple servers (e.g., nodes of a distributed ledger). A smart contract may be stored within the distributed ledger, where the smart contract may comprise the instances of unavailability specified by the primary user that will cause the secondary users to have access to the primary user's resources. Accordingly, once a data record regarding the primary user's unavailability has been written to the distributed ledger, the smart contract may automatically trigger the authentication agent to detect that the primary user is unavailable. Thereafter, the authentication agent may search for matches within the authentication credential repository upon receiving authentication credentials from the secondary user.

In some embodiments, the individual characteristic data authentication credential repository may be stored in a raw data format. For instance, if the individual characteristic data is fingerprint data, the fingerprint data may be stored as a raw image file. In such scenarios, it may be necessary to convert the image data into a format that may be recognized by the endpoint device as a valid authentication credential (e.g., a valid fingerprint sample). In this regard, endpoint devices from different manufacturers or even across different generations from the same manufacturer may store individual characteristic data differently (e.g., fingerprint data may be captured using different resolution sensors, or converted into a hash value using different algorithms, and/or the like). Accordingly, in some embodiments, the authentication agent may use a machine learning model that is capable of transforming the raw data stored within the authentication credential repository into a format that is compatible with the specific endpoint device. The machine learning models may be continuously updated for new models or generations of endpoint devices. In this way, the system may ensure that the individual characteristic data stored within the authentication credential repository may be usable by any endpoint device on which the authentication agent is installed.

An exemplary embodiment is provided as follows. It should be understood that the following example is provided for illustrative purposes only and is not intended to restrict the scope of the disclosure provided herein. In one embodiment, a primary user may use a password manager (e.g., a resource) on the user's smartphone (e.g., an endpoint device) to manage login credentials for various websites. In the event of the primary user's unavailability (e.g., if the primary user is deceased), the primary user may wish to grant access to the password manager, along with the login credentials of the primary user, to a family member (e.g., a secondary user). In such embodiments, the primary user may designate the family member as an authorized secondary user (e.g., by logging into an application or site associated with the authentication credential repository and/or the authentication agent). The family member may visit the premises of an entity (e.g., an organization that may host or be otherwise associated with the authentication credential repository) to complete an onboarding process by which the secondary user's individual characteristic data (e.g., facial recognition data, fingerprint data, retinal scan data, voice data, gait data, and/or the like) is captured and stored within the authentication credential repository. The individual characteristic data may be stored with and associated with metadata regarding the secondary user (e.g., biographical information, the primary user with whom the secondary user is associated, the nature of the relationship to the primary user, and/or the like).

Some time thereafter, the primary user may become unavailable, which then causes the secondary user to input the secondary user's individual characteristic data into the smart phone of the primary user. Typically, the individual characteristic data provided to the smart phone will be of the same type as what was provided during the onboarding process. The authentication agent stored on the smart phone may then determine whether the primary user has become unavailable. In this regard, the authentication agent may retrieve data from an internal database (e.g., the user status database) and/or third party databases (e.g., government databases regarding the status of the user) and, based on the data retrieved, determine that the primary user has become unavailable. The authentication agent may then receive the individual characteristic data from the secondary user and search the authentication credential repository for a match with the individual characteristic data. Once the match has been detected, the authentication agent may grant access to the resource (e.g., password manager) stored on the device of the primary user.

The system as described herein provides a number of technological benefits over conventional authentication systems. In particular, by using an authentication agent in conjunction with an authentication credential repository, the system may ensure that resources secured using individual characteristic data, which may be difficult to acquire and use by secondary parties, may nevertheless be securely accessed by certain authorized users in the event of the primary user's unavailability. Furthermore, by using a machine learning model, the authentication agent may learn how to convert the raw data stored within the authentication credential into a format that is readable by the specific device on which the authentication is installed, thereby ensuring compatibility with existing and future endpoint devices.

FIGS. 1A-1C illustrate technical components of an exemplary distributed computing environment 100 for the system for provisioning authenticated access to resources linked with individual characteristic data. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for provisioning authenticated access to resources linked with individual characteristic data, in accordance with an embodiment of the present disclosure. The process begins at block 202, where the system receives, at an endpoint device associated with a primary user, a request from a secondary user to access a resource stored on the endpoint device, wherein the request comprises individual characteristic data associated with the secondary user. The resource may be an electronically stored resource that may be secured by individual characteristic data associated with the primary user, such as a thumbprint, facial image capture, retinal scan, and/or the like. Accordingly, the resource may include applications, data files, cryptographic keys, and/or the like, to which the primary user may wish to provide authorized access to certain designated third parties (e.g., trusted users such as family members) in the event that the primary user becomes unavailable. To this end, the system may present a graphical user interface to the primary user that comprises one or more interface elements (e.g., text entry fields, drop-down menus, radio buttons, and/or the like) that may allow the primary user to select one or more secondary users as authorized users as well as the specific conditions that must be fulfilled before the authorized users may gain access to the primary user's resources (e.g., the nature of the primary user's unavailability). In some embodiments, the graphical interface may further comprise interface elements configured to allow the primary user to revoke authorization from one or more secondary users who have been previously designated as authorized users by the primary user. Subsequent to the primary user designating the secondary user as an authorized user, the secondary user may attempt to provide the secondary user's authentication credentials (e.g., the individual characteristic data) to the endpoint device of the primary user.

The process continues to block 204, where the system determines whether the primary user is unavailable. In this regard, in some embodiments, determining whether the primary user is unavailable may comprise retrieving user status data associated with the primary user from one or more third party databases and verifying the user status data to determine the primary user's availability. If the system determines that the primary user is available (e.g., the primary user is not unavailable), the process proceeds to and terminates at block 205, where the system rejects the request of the secondary user. In this regard, the system may block the secondary user from accessing the endpoint device of the primary user as well as the resources stored thereon. In this way, while the primary user remains available, the endpoint device may function as expected by the primary user.

If the system determines that the primary user is unavailable, the process continues to block 206, where the system, based on determining that the primary user is unavailable, retrieves reference authentication data from an authentication credential repository. The reference authentication data may include individual characteristic data provided by the secondary user to be stored in the authentication credential repository upon being designated as an authorized user by the primary user. For instance, in one embodiment, the secondary user may visit a facility operated for the purpose of capturing individual characteristic data (e.g., a fingerprinting center).

The individual characteristic data stored within the authentication credential repository may be stored in a raw data format (e.g., image data of fingerprints, retinal scans, and/or the like) that is not directly readable or recognizable as authentication data by a particular endpoint device. Accordingly, in some embodiments, retrieving the reference authentication data may further comprise using a machine learning model to convert the reference authentication data into a format that is recognized as authentication credentials by the endpoint device. In this way, the system may ensure that individual characteristic data that is captured at a single point in time may be compatible with present and future devices.

The process continues to block 208, where the system determines whether a match is detected between the individual characteristic data associated with the secondary user and an entry within the reference authentication data. If no match is detected, the process proceeds to and terminates at block 209, where the system rejects the request of the secondary user. Accordingly, the system may block the secondary user from accessing the endpoint device and the resources stored thereon.

If a match is detected, the process continues to block 210, where the system grants, to the secondary user, authorized access to the resource. In some embodiments, detecting a match may comprise comparing the reference authentication data that has been converted by the machine learning model (or "converted reference authentication data") with the individual characteristic data provided by the secondary user. In this regard, the individual characteristic data provided by the secondary user may be analyzed for distinguishing characteristics that may then converted into a cryptographic hash value. The system may further use the same process to identify the characteristics of within the reference authentication data to generate a reference hash value. If the cryptographic hash value matches the reference hash value, the system may determine that a match as been detected. In some embodiments, detecting the match may further comprise additional validation checks. For instance, the system may further verify that the name associated with the matching individual characteristic data within the reference authentication data has been registered as an authorized user by the primary user. In this way, the system may provide a secure way to provision authorized access to secondary users.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for provisioning authenticated access to resources linked with individual characteristic data, the system comprising:

at least one non-transitory storage device; and at least one processor coupled to the at least one non-transitory storage device, wherein the at least one processor is configured to:

receive, at an endpoint device associated with a primary user, a request from a secondary user to access a resource stored on the endpoint device, wherein the request comprises individual characteristic data associated with the secondary user;

convert the individual characteristic data associated with the secondary user to a cryptographic hash value;

determine that the primary user is unavailable based on one or more predefined circumstances, wherein determining that the primary user is unavailable comprises:

retrieving user status data associated with the primary user by communicating with one or more third party entity systems; and verifying the user status data matches the one or more predefined circumstances to determine unavailability of the primary user;

based on determining that the primary user is unavailable, retrieve reference authentication data from an authentication credential repository, wherein the reference authentication data is stored within the authentication credential repository in a raw data format that is not directly readable as authentication data by an endpoint device;

use a machine learning model to convert the reference authentication data from the raw data format into a format that is recognizable to the endpoint device and compatible to be accessed by the endpoint device as authentication data, wherein the format that is recognizable to the endpoint device is associated with a reference hash value based on the reference authentication data;

determine a match between the individual characteristic data associated with the secondary user and an entry within the reference authentication data by comparing the cryptographic hash value with the reference hash value:

grant authorized access to the secondary user to the resource stored on the endpoint device;

following granting the authorized access for the secondary user, determine that the primary user is no longer unavailable; and revoke access to the secondary user to the resource stored on the endpoint device in response to the determination that the primary user is no longer unavailable.

2. The system of claim 1, wherein the at least one processor is further configured to present a graphical user interface on a display of the endpoint device, wherein the graphical user interface comprises one or more interface elements configured to receive, from the primary user, a selection of the secondary user as an authorized user.

3. The system of claim 2, wherein the one or more interface elements are further configured to receive, from the primary user, a revocation of authorization with respect to the secondary user.

4. The system of claim 1, wherein the individual characteristic data associated with the secondary user comprises a fingerprint sample.

5. A computer program product for provisioning authenticated access to resources linked with individual characteristic data, the computer program product comprising a non-transitory computer-readable medium comprising code causing an apparatus to:

receive, at an endpoint device associated with a primary user, a request from a secondary user to access a resource stored on the endpoint device, wherein the request comprises individual characteristic data associated with the secondary user;

convert the individual characteristic data associated with the secondary user to a cryptographic hash value;

determine that the primary user is unavailable based on one or more predefined circumstances, wherein determining that the primary user is unavailable comprises:

retrieving user status data associated with the primary user by communicating with one or more third party entity systems; and verifying the user status data matches the one or more predefined circumstances to determine unavailability of the primary user;

based on determining that the primary user is unavailable, retrieve reference authentication data from an authentication credential repository, wherein the reference authentication data is stored within the authentication credential repository in a raw data format that is not directly readable as authentication data by an endpoint device;

use a machine learning model to convert the reference authentication data from the raw data format into a format that is recognizable to the endpoint device and compatible to be accessed by the endpoint device as authentication data, wherein the format that is recognizable to the endpoint device is associated with a reference hash value based on the reference authentication data;

determine a match between the individual characteristic data associated with the secondary user and an entry within the reference authentication data by comparing the cryptographic hash value with the reference hash value:

grant authorized access to the secondary user to the resource stored on the endpoint device;

following granting the authorized access for the secondary user, determine that the primary user is no longer unavailable; and revoke access to the secondary user to the resource stored on the endpoint device in response to the determination that the primary user is no longer unavailable.

6. The computer program product of claim 5, wherein the code further causes the apparatus to present a graphical user interface on a display of the endpoint device, wherein the graphical user interface comprises one or more interface elements configured to receive, from the primary user, a selection of the secondary user as an authorized user.

7. The computer program product of claim 6, wherein the one or more interface elements are further configured to receive, from the primary user, a revocation of authorization with respect to the secondary user.

8. A computer-implemented method for provisioning authenticated access to resources linked with individual characteristic data, the computer-implemented method comprising:

receiving, at an endpoint device associated with a primary user, a request from a secondary user to access a resource stored on the endpoint device, wherein the request comprises individual characteristic data associated with the secondary user;

converting the individual characteristic data associated with the secondary user to a cryptographic hash value;

determining that the primary user is unavailable based on one or more predefined circumstances, wherein determining that the primary user is unavailable comprises:

retrieving user status data associated with the primary user by communicating with one or more third party entity systems; and verifying the user status data matches the one or more predefined circumstances to determine unavailability of the primary user;

based on determining that the primary user is unavailable, retrieving reference authentication data from an authentication credential repository, wherein the reference authentication data is stored within the authentication credential repository in a raw data format that is not directly readable as authentication data by an endpoint device;

use a machine learning model to convert the reference authentication data from the raw data format into a format that is recognizable to the endpoint device and compatible to be accessed by the endpoint device as authentication data, wherein the format that is recognizable to the endpoint device is associated with a reference hash value based on the reference authentication data;

determining a match between the individual characteristic data associated with the secondary user and an entry within the reference authentication data by comparing the cryptographic hash value with the reference hash value;

granting authorized access to the secondary user to the resource stored on the endpoint device;

following granting the authorized access for the secondary user, determining that the primary user is no longer unavailable; and revoking access to the secondary user to the resource stored on the endpoint device in response to the determination that the primary user is no longer unavailable.

9. The computer-implemented method of claim 8, wherein the computer-implemented method further comprises presenting a graphical user interface on a display of the endpoint device, wherein the graphical user interface comprises one or more interface elements configured to receive, from the primary user, a selection of the secondary user as an authorized user.

10. The computer-implemented method of claim 9, wherein the one or more interface elements are further configured to receive, from the primary user, a revocation of authorization with respect to the secondary user.

11. The computer-implemented method of claim 8, wherein the individual characteristic data associated with the secondary user comprises a fingerprint sample.

12. The system of claim 1, wherein the individual characteristic data associated with the secondary user comprises a retinal scan.

13. The system of claim 1, wherein the individual characteristic data associated with the secondary user comprises a facial scan.

14. The computer program product of claim 5, wherein the individual characteristic data associated with the secondary user comprises a fingerprint sample.

15. The computer program product of claim 5, wherein the individual characteristic data associated with the secondary user comprises a retinal scan or facial scan.

16. The computer-implemented method of claim 8, wherein the individual characteristic data associated with the secondary user comprises a retinal scan.

17. The computer-implemented method of claim 8, wherein the individual characteristic data associated with the secondary user comprises a facial scan.

* * * * *